United States Patent [19]

Bredbenner et al.

[11] Patent Number: 4,826,882

[45] Date of Patent: May 2, 1989

[54] OPEN CELLED POLYURETHANE FOAMS

[75] Inventors: Charles W. Bredbenner, Hazleton; Richard Rupp, Wapwallopen, both of Pa.

[73] Assignee: PMC, Inc., Sun Valley, Calif.

[21] Appl. No.: 181,837

[22] Filed: Apr. 15, 1988

[51] Int. Cl.$^4$ .................... C08H 9/00; C08G 18/00
[52] U.S. Cl. .................... 521/112; 521/110; 521/114; 521/172; 521/174
[58] Field of Search ............ 521/110, 112, 174, 172, 521/114

[56] References Cited

U.S. PATENT DOCUMENTS

| | | | |
|---|---|---|---|
| 3,748,288 | 7/1973 | Winkler et al. | 260/2.5 AH |
| 3,884,848 | 5/1975 | Ricciardi et al. | 260/2.5 BD |
| 4,178,161 | 12/1979 | Rudner et al. | 55/524 |
| 4,656,196 | 4/1987 | Kelly et al. | 521/52 |

*Primary Examiner*—Morton Foelak
*Attorney, Agent, or Firm*—Davis Hoxie Faithfull & Hapgood

[57] ABSTRACT

Improved, flexible, open celled polyurethane foams are described. The foams are formed in situ from the reaction of a polyisocyanate, a conventional polyester polyol, a polyether polyol, a high hydroxyl polyester polyol and a blowing agent in the presence of a catalyst. A polyether foam stabilizer is normally also included. A small amount of a destabilizing silicone ingredient can also be included. Useful high hydroxyl number polyester polyols have hydroxyl numbers in the range 300–600, and preferably 400–450. The average equivalent weight of the useful high hydroxyl number polyester polyol is normally in the range 100–200. The compositions of the invention are useful as filter media and are especially suitable for outdoor seating applications.

13 Claims, No Drawings

OPEN CELLED POLYURETHANE FOAMS

FIELD OF THE INVENTION

This invention relates to flexible, open celled, free rise polyurethane (PU) foams made by continuous casting methods. The improved open celled PU foams have utility as filter media, and also have the firmness and other characteristics which make them especially suitable for outdoor seating applications.

DESCRIPTION OF RELATED ART

A method for preparing open celled, flexible PU foams employing a combination of polyester and polyether polyols in narrowly defined ratios and including the use of silicone surfactants especially developed for use in the manufacture of polyether type PU foams has been practiced commercially. In that process the preparation of the flexible, open celled urethane product called for the reaction of an organic polyisocyanate, a polyester polyol and water. From 5% to 35% by weight (of total polyol reactants) comprised an isocyanate-reactive polyether polyol, and the reaction mixture included a hydrophilic organo-silicone foam-stabilizing emulsifier-surfactant intended for use in the preparation of polyether type urethane foams, and a hydrophobic, anti-foaming organo-silicone compound. This process is disclosed in U.S. Pat. No. 3,748,288 issued July 24, 1973. The full text of this patent is hereby expressly incorporated herein by reference. One of the principal uses for the open celled PU foam produced by this method was the production of general purpose filters.

Another method for producing flexible, open celled PU foam in situ included the incorporation in a polyester formulation of a small amount of an ester compound having the formula $(RCOO)_nR'$, where R and R' are alkyl or alkenyl groups having from 1 to 30 carbon atoms, wherein at least one of R and R' have at least 3 carbon atoms, and wherein n is an integer from 1 to 3. A polyether polyol-type, foam-stabilizing organo-silicone emulsifier was also added to the reaction mixture. The useful ester additives included stearyl methacrylate, 2-ethylhexyl acrylate, methyl methacrylate, butyl methacrylate, lauryl methacrylate, butyl oleate, butyl stearate, trimethylolpropane, trimethacrylate and ethylene glycol dimethacrylate. The amount of one or more of these esters was from about 2 to about 10 parts by weight per 100 parts total weight of the polyol from which the flexible urethane foam was made. This process is disclosed in U.S. Pat. No. 3,884,848 issued May 20, 1975. The full text of this patent is hereby expressly incorporated herein by reference. The foams produced according to this process had utility in flame laminating processes and as filter media.

More recently, it was found that a stable open celled polyester-type polyurethane foam with good physical properties can be made from conventional formulations if about 5 to 20% by weight of the polyester polyol reactant is replaced by a modified polyether polyol, i.e., by a polyether polyol having dispersed therein either polymers of ethylenically unsaturated monomers such as polyacrylonitrile, polystyrene, poly (styrene coacrylonitrile), or polyurea. These are commonly referred to as "polymer polyols." It was found that in such a formulation, the need for a small amount of a hydrophobic, anti-foaming organo-silicone compound or of an ester of the formula $(RCOO)_nR'$ can be eliminated, depending on the type and amount of polyol, the block size, cell size and other formulation parameters. This process is disclosed in U.S. Pat. No. 4,656,196 issued April 7, 1987. The full text of this patent is hereby expressly incorporated herein by reference.

The desirability of making foams such as those described above with increased firmness, (or stiffness or hardness), has also been recognized. One way of achieving this is to treat pairs of sheets of convoluted air-permeable flexible polyurethane foam by partially (surface only) impregnating them with a mixture of a thermosetting melamine, urea or benzoguanamine resin and a cross-linker while the sheets form a nested pair. That is, the convolution peaks of one sheet are positioned in the valleys of the other sheet of the pair, so that the combination when being impregnated has essentially the same thickness as the sheet had prior to its convolution. Machines for convoluting foam are commercially available, for example, from Fecken-Kirfel KG located in Aachen, West Germany. The nested pair of sheets is back impregnated on each side to a depth less than the valley of each sheet and the resin and cross-linker are reacted. The amount of resin and cross-linker used is predetermined so as to not appreciably impair the permeability of the foam and to increase the rigidity of the foam sufficiently so that the unnested sheets will be self-standing. The sheets are separated after the resin has cross-linked. This process is described in U.S. Pat. No. 4,178,161 issued Dec. 11, 1979. As will be readily appreciated, stiffness can be imparted by impregnating the abovedescribed mixtures into non-convoluted foams as well.

BRIEF DESCRIPTION OF THE INVENTION

As will be appreciated, for many end uses of foams, particularly for the coarser cell grades, it is desirable to have foams which are as firm as possible. Many of the formulation parameters normally used by those skilled in the art to achieve firmer foams, such as use of higher functionality or lower molecular weight polyols, higher catalyst levels, crosslinking additives, fillers, etc., are not totally suitable because they do not allow for maintaining the fully open coarse cell structure.

The use of high hydroxyl number polyesters to increase the "crisp" feel, hardness and die-cuttability of polyester foams has been recognized for years. One example of such a polyester useful for this purpose is a product sold by Witco Chemical Corporation of Chicago, Ill., under the trademark FOMREZ® YA 21-1, having a hydroxyl number of 410 to 420. Substitution of this product for the usual polyester in open celled filter foams, in amounts of 1 to 20 parts per hundred, produces firm foams, but these foams are not fully acceptable over a wide range of cell sizes, do not provide for a rapid cure, or do not result in good stability since it produces settling in large blocks.

It has now been discovered in accordance with the invention that substitution of a high hydroxyl number polyester for a portion of the polyether usually used results in firm foams which are much more stable and easy to process without an adverse effect on the amount of open cells. The ability to increase the proportion of the polyester component in this type of formulation, which includes silicones designed and adapted for use in the manufacture of polyether foams, was unexpected. Whereas the usual amount of polyether polyol comprises from 10 to 30% by weight of the total polyol, with a preferred range of from 15 to 20% by weight, it has now been found in accordance with the invention that as much as one-half of the polyether component can be replaced by the high hydroxyl number polyester additive. Accordingly, the total polyol composition in accordance with the invention comprises from about 70 to 90% conventional polyester polyol, from about 5 to 15% polyether polyol and from about 5 to 15% high hydroxyl number polyester additives. Preferably, compositions according to the invention comprise about 80 to 85% polyester polyol, about 5 to 10% polyether polyol and about 5 to 7.5% high hydroxyl number polyester additive.

Polyether PU foam stabilizers are usually included in the formulations of the invention in amounts of about 1 to 6 parts based on total polyol. These stabilizers are normally organo-silicon ethers.

The use of a destabilizing silicone ingredient, such as is disclosed in the patents mentioned above, is optional, and, as will be readily understood by those familiar with the art, depends on the cell size, the density of the foam, the size of the block being manufactured, the type of polyether used and the amount of additive, and can range from 0%, for larger, coarse cell blocks and high levels of high hydroxyl number polyester additive, to 0.25% based on total polyol, for finer celled, lower crosslinker-additive type foams. As will be readily appreciated by those skilled in the art, the finer the cell size of the foam, the more stable the foam, all else being equal. Conversely, the coarser the cell size of the foam, the less stable the foam. Addition of a destabilizing silicone ingredient, such as JW-50, a polydimethyl siloxane sold by Dow Corning as DC-200, is accordingly less likely to be desirable for coarser foams, since if the foam becomes too unstable, it will collapse. The capability to make stable coarse cells is one advantage of the present invention.

Conventionally, flexible polyester PU foams are made by reacting a polyisocyanate (such as tolylene diisocyanate, or TDI, for example) with a polyester polyol and water. In some formulations designed to produce fully delustered open celled foams, small amounts of polyether polyol have been included and the amount of polyester polyol was correspondingly decreased. It has now been found that by replacing up to one-half of the polyether polyol ingredient with a high hydroxyl number polyester polyol, firm open celled foams which are quite stable in processing can be made.

DETAILED DESCRIPTION OF THE INVENTION

The invention concerns improved flexible, open-celled PU foams and a method of making them. The improved foams are made by forming a polyol mixture of about 70-90% by weight of conventional polyester polyol, about 5-15% by weight of polyether polyol and about 5-15% by weight of high hydroxyl number polyester polyol additive and mixing with a polyisocyanate and a blowing agent in the presence of a catalyst. A polyether foam stabilizer is normally also included. The compositions of the invention generally have cell counts in the range of 10-80 PPI, preferably 15-35, and exhibit Indentation Force Deflection measurements (IFD 2"-25%) of about 20-35, preferably about 25-35.

The conventional polyester polyol reactants useful in the invention are those known to those skilled in the art to be suitable in the production of PU foams. The conventional polyester reactant normally has an average molecular weight of about 800 to 3000, with the hydroxyl number of the polyester being in the range of about 35 to about 150. Generally preferred are polyester reactants of about 1700-2500 average molecular weight having an average hydroxyl functionality of between about 2 and 3. The polyester reactants useful in the invention can be obtained, for example, by the esterification of polycarboxylic acids with polyhydric alcohols. If desired, the acid halides or anhydrides of the polycarboxylic acids can be reacted with the alcohols. Most preferred are the conventional commercial products made from adipic acid, diethylene glycol and a small percentage of glycerine.

The polyether polyol reactants useful in the invention are also conventional in the art. The polyether polyol normally has a molecular weight of about 2000 to about 6500 and preferably from about 2700 to about 3900, with a hydroxyl functionality of about 2 to about 8, preferably about 2 to about 3. Suitable polyethers can be prepared by the addition of an excess of alkylene oxides, such as propylene oxide and ethylene oxide, to glycerine, trimethylolpropane, pentaerythritol, alphamethylglucoside, sorbitol or sucrose, for example. Most preferred are polyethers of glycerine, propylene oxide and ethylene oxide and those modified by copolymerizing with styrene or mixtures of styrene and acrylonitrile. The latter are commonly referred to as "polymer polyols" or "graft polyols."

The high hydroxyl number polyester polyol additives useful in the invention are generally prepared in the same manner as are the polyester polyol reactants which form about 70-90% of the total polyol composition. That is, they are normally esters formed by reacting carboxylic acids and one or more polyhydric alcohols. The useful high hydroxyl number polyester polyols of the invention have hydroxyl numbers in the range 300-600. Preferably, the hydroxyl number will be in the range 400-450. The average equivalent weight of useful high hydroxyl number polyester polyol additives is in the range of about 100 to 200. The additive of choice is sold by Witco Chemical Corporation, is designated herein as FOMREZ® YA 21-1 and has a hydroxyl number of 410-420.

The polyisocyanate used in the invention is also a conventional material in the art of PU foam production. Preferably, TDI is employed and, as used, is one of the conventional mixtures of the 2,4 and 2,6 isomers, ranging from about 65 to 80% of the 2,4 isomer. However, other polyisocyanates having on average 2 isocyanate groups per aromatic ring are suitable. Examples of such compounds are phenylene diisocyanate, naphthalene diisocyanate, diphenyl-4,4'-diisocyanate, xylene diisocyanate, and the like. The amount of polyisocyanate normally added (i.e., the polyisocyanate index) is about 103 to about 120% of the amount required to react stoichiometrically with the reactive groups in the formulation, which reactive groups comprise primarily the hydroxyl groups of the polyols and the water.

Conventional blowing agents and catalysts are also used in the present invention. Water and/or volatile organic substances can be used as blowing agents. Water is preferred and can be supplemented by volatile organic blowing agents. Water can be present in an amount from about 2 to about 6 parts by weight per 100 parts by weight of total polyol present. Preferably, water is present in amounts of about 3 to about 5 parts per 100 parts of polyol.

Salts of organic acids or organometallic compounds are usually used to catalyze the reaction. Organic tin compounds are normally used and useful catalysts include salts of carboxylic acids such as tin (II) acetate, tin (II) octoate, tin (II) ethylhexoate, tin (II) laurate and dialkyl tin salts such as dibutyl tin diacetate, dibutyl tin dilaurate, dibutyl tin maleate and dioctyl tin diacetate. The organic metal catalyst is normally added in amounts of from about 0.1 to about 1.0 parts by weight per 100 parts by weight of total polyol present. Preferably it is present in amounts of about 0.1 to about 0.6 parts. Preferred is stannous octoate.

Tertiary aliphatic amines are also conventional and are used as co-catalysts in the production of the PU foams of the invention. Useful such compounds include, for example, triethylenediamine, N-ethylmorpholine, N,N,N',N'-tetramethyl-1,3-butanediamine, bis 2-(N,N-dimethylamino) ethyl ether, diethylenetriamine, oxybis (N,N'-diethanolamine) and other such compounds. Such compounds normally are added in amounts of from about 0.1 to about 0.6 parts by weight per 100 parts by weight of total polyol present. Preferably, they are present in amounts of about 0.2 to 0.4 parts. Preferred are mixtures of diethylenetriamine and oxybis (N,N'-diethanolamine).

Polyether PU foam stabilizers can also be and usually are included in the reaction mixture of the present invention. Useful stabilizers include those well known to the art. Such stabilizers are normally organo-silicon ethers. Preferred is UCC Silicone Surfactant L 560, commercially available from Union Carbide Corporation. Normally, such stabilizers are added in amounts of from about 1 to about 6 parts by weight per 100 parts by weight of total polyol present. Preferably, they are present in amounts of about 2 to 5 parts.

A destabilizing silicone ingredient, such as those conventionally used in the art, can be added depending on the specific formulation, the desired cell size of the PU foam, the size of the block being manufactured, machine conditions, the amount of the high hydroxyl number polyester polyol additive in the formulation, etc. It is not needed at all for the least stable systems, such as those having very coarse cell structure, and particularly those in which the polyether component is a polymer polyol. The destabilizer can be present in amounts up to 0.25 parts by weight per 100 parts by weight of total polyol used. Generally, the larger the cell size desired, the less destabilizer should be used and vice versa. Also, the more high hydroxyl number polyester present, the less destabilizer should be used and vice versa.

Other optional ingredients which can be added to the formulations of the invention include discoloration and aging inhibitors, flame retardants, pigments, such as carbon black, colorants, and the like.

Production of the PU foams of the invention can be achieved by use of a conventional foam making machine operated in a manner known to those skilled in the art. Reactants and additives are mixed together and deposited on a moving casting conveyor in a manner well known to workers in the art.

The following examples illustrate the invention, but are not intended to be exclusive of the full scope of the invention. The ingredients listed in the examples are here described:

Pluracol PL 637 - a polyether polyol containing grafted polystyrene and acrylonitrile and homopolymers of styrene acrylonitrile. It is sold by BASF Wyandotte.

Niax Polyol 37-32 - a polyether polyol similar to Pluracol PL 637. It is sold by Union Carbide Corporation.

Fomrez F-76 - a diethylene glycol adipate polyester (with glycerine) having a hydroxyl number of about 59. It is sold by Witco Chemical Corporation.

Fomrez® YA 21-1 - a high hydroxyl number (410-420) polyester polyol comprising the reaction products of carboxylic acids and one or more polyhydric alcohols. It is sold by Witco Chemical Corporation.

C-4 - a tin catalyst comprising stannous octoate diluted with an equal amount of di(2-ethylhexyl) phthalate plasticizer. It is sold by Witco Chemical Corporation.

L-560 - a polyether foam stabilizing agent comprising a polyalkylene oxide dimethylsiloxane copolymer. It is sold by Union Carbide Corporation.

T-10 - a tin catalyst similar to C-4. It is sold by Air Products and Chemicals, Inc. C-232 - a tertiary amine catalyst comprising a blend of 3 parts bis (2-dimethylaminoethyl) ether 70% in dipropylene glycol 30% and 1 part diethylene triamine 33% in propylene glycol 67%.

JW-50 - a destabilizing silicone ingredient oomprising a polydimethyl siloxane. It is sold by Dow Corning as DC-200.

In addition to the above-listed ingredients, TDI was a component of all the exemplified mixtures.

The IFD 2"-25% data given are Indentation Force Deflection measurements performed in accordance with ASTM D3574-86 Test B.

The cell count is the number of cells or pores per linear inch. The coarser the cells, the lower the cell count. The finer the cells, the higher the cell count.

The units of density are lbs./ft.$^3$.

Examples numbers 1, 18 and 31 contain no high hydroxyl number polyester ingredient.

TABLE A

| Ingredients | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| PL 637 | — | — | — | — | — | — | — | — | — | — | — | — | — | — | — | — | — | 15.0 | — | — | — |
| 37-32 | 15 | 15 | 15 | 7.5 | 7.5 | 7.5 | 7.5 | 7.5 | 7.5 | 10 | 10 | 10 | 10 | 10 | 10 | 10 | 8.13 | — | 10 | 10 | 10 |
| F-76 | 85 | 80 | 80 | 85 | 85 | 85 | 85 | 85 | 85 | 85 | 85 | 85 | 85 | 85 | 85 | 85 | 85.0 | 85.0 | 85 | 85 | 85 |
| YA 21-1 | — | 5 | 5 | 7.5 | 7.5 | 7.5 | 7.5 | 7.5 | 7.5 | 5 | 5 | 5 | 5 | 5 | 5 | 5 | — | — | 5 | 5 | 5 |
| TDI | 57 | 59.48 | 59.48 | 56 | 56 | 56 | 56 | 56 | 61.07 | 54.12 | 59.4 | 46.53 | 46.53 | 46.53 | 46.53 | 46.53 | 6.87 | 56.74 | 54.12 | 54.12 | 54.12 |
| TDI Index | 110 | 110 | 110 | 112 | 112 | 112 | 112 | 112 | 108 | 112 | 108 | 112 | 112 | 112 | 112 | 112 | 55.54 | 110 | 112 | 112 | 112 |
| C-4 | — | — | — | — | — | — | — | — | — | — | — | — | — | — | — | — | 112 | .12 | — | — | — |
| L-560 | 4.3 | 4.3 | 4.5 | 4.75 | 4.75 | 4.75 | 4.75 | 4.75 | 4.75 | 4.75 | 4.75 | 4.75 | 4.75 | 4.75 | 3.5 | 3.5 | .75 | 4.3 | 4.75 | 4.75 | 4.75 |
| T-10 | .15 | .15 | .25 | .15 | .25 | .3 | .5 | .75 | .9 | .5 | .75 | .5 | .35 | .5 | .5 | .5 | 4.75 | — | .6 | .6 | .5 |
| Water | 4.4 | 4.4 | 4.4 | 3.8 | 3.8 | 3.8 | 3.8 | 3.8 | 4.5 | 3.8 | 4.5 | 3.2 | 3.2 | 3.2 | 3.2 | 3.2 | — | 4.4 | 3.8 | 3.8 | 3.8 |
| C-232 | .25 | .25 | .25 | .2 | .2 | .3 | .3 | .15 | .15 | .15 | .15 | .15 | .25 | .15 | .15 | .15 | 3.8 | .23 | .15 | .15 | .25 |
| JW-50 | .165 | .1 | .1 | — | — | — | — | — | — | — | — | — | — | .1 | — | .1 | .15 | .07 | — | — | — |
| IFD 2''−25% | 21.5 | — | 39.0 | — | 38.5 | — | 47.5 | 50.0 | 45.0 | 32.0 | 33.0 | 25.5 | 25.0 | — | 29.5 | 29.0 | 35 | 21 | 27.5 | 28.0 | 30.0 |
| Cell Count, PPI | 18-20 | — | 30-32 | — | 22-24 | — | 18-20 | 16-18 | 18-20 | 16-18 | 20-22 | 16-18 | 16-18 | — | 18-20 | 16-18 | 25-30 | 25-30 | 12 | 10-12 | 8-10 |
| Density | 1.66 | — | 1.76 | — | 1.90 | — | 1.96 | 1.89 | 1.54 | 1.49 | 1.31 | 1.95 | 1.97 | — | 1.92 | 1.99 | 1.3 | 1.25 | 1.50 | 1.47 | 1.51 |

| Ingredients | 22 | 23 | 24 | 25 | 26 | 27 | 28 | 29 | 30 | 31 |
|---|---|---|---|---|---|---|---|---|---|---|
| PL 637 | — | — | — | — | — | — | — | — | — | — |
| 37-32 | 7.5 | 15 | 15 | 15 | 15 | 12.5 | 10 | 10 | 10 | 15 |
| F-76 | 85 | 80 | 80 | 80 | 80 | 80 | 85 | 85 | 85 | 85 |
| YA 21-1 | 7.5 | 5.0 | 5.0 | 5.0 | 5.0 | 7.5 | 5 | 5 | 5 | — |
| TDI | 56 | 55.1 | 55.1 | 55.1 | 55.1 | 56.71 | 47.76 | 45.36 | 45.36 | 47.77 |
| TDI Index | 112 | 112 | 112 | 112 | 112 | 112 | 112 | 120 | 120 | 112 |
| C-4 | 0.15 | 0.15 | 0.15 | 0.15 | 0.15 | 0.15 | 3.5 | 3.5 | 2.0 | 4.3 |
| L-560 | 4.5 | 4.3 | 4.3 | 4.3 | 3.5 | 4.0 | 0.15 | 0.15 | 0.15 | 0.15 |
| T-10 | — | — | — | — | — | — | 3.2 | 2.7 | 2.7 | 3.5 |
| Water | 3.8 | 3.8 | 3.8 | 3.8 | 3.8 | 3.8 | .232 | .232 | .35 | .232 |
| C-232 | 0.2 | .2 | .2 | .2 | .2 | .08 | — | — | — | — |
| JW-50 | — | — | — | .08 | .08 | .08 | — | — | — | .162 |
| IFD 2''−25% | 25.0 | — | 22.0 | 21.0 | 21.5 | 25.0 | 17.5 | 19.5 | — | 19.0 |
| Cell Count, PPI | 16-18 | — | 10-12 | 12-14 | 16-18 | 16-20 | 12-14 | 12-14 | — | 22-24 |
| Density | 1.54 | — | 1.51 | 1.51 | 1.55 | 1.53 | 1.75 | 1.91 | — | 1.66 |

What is claimed is:

1. An improved flexible, open celled polyurethane foam produced in situ from the reaction in the presence of a catalyst of a polyisocyanate, a blowing agent, a polyether foam stabilizer and a polyol mixture comprising about 70-90% by weight of a conventional polyester polyol, about 5-15% by weight of a polyether polyol and about 5-15 by weight of a high hydroxyl number polyester polyol additive, wherein the hydroxyl number of the conventional polyester polyol is about 35-150 and the hydroxyl number of the high hydroxyl number polyester polyol is about 300-600.

2. The foam of claim 1 which has an enhanced IFD value as compared to foam having more than 5-15% by weight of a polyether polyol but having substantially no high hydroxyl number polyester polyol.

3. The foam of claim 1 wherein the polyisocyanate is tolylene diisocyanate.,

4. The foam of claim 1 wherein the high hydroxyl number polyester polyol comprises the reaction products of carboxylic acids and at least one polyhydric alcohol.

5. The foam of claim 4 wherein the hydroxyl number of the high hydroxyl number polyester polyol is in the range 400-450.

6. The foam of claim 5 which has an enhanced IFD value as compared to foam having more than 5-15% by weight of a polyether polyol but having substantially no high hydroxyl number polyester polyol.

7. The foam of claim 1 which also comprises up to about 0.25% by weight of a destabilizing silicone ingredient.

8. The foam of claim 1 wherein the polyol mixture comprises about 80-85% by weight of conventional polyester polyol, about 5-10% by weight of a polyether polyol and about 5-7.5% by weight of a high hydroxyl number polyester polyol additive.

9. The foam of claim 8 wherein the polyisocyanate is tolylene diisocyanate.

10. The foam of claim 8 wherein the high hydroxyl number polyester polyol comprises the reaction products of carboxylic acids and at least one polyhydric alcohol.

11. The foam of claim 10 wherein the hydroxyl number of the high hydroxyl number polyester polyol is in the range 400-450.

12. The foam of claim 11 which has an enhanced IFD value as compared to foam having more than 5-15% by weight of a polyether polyol but having substantially no high hydroxyl number polyester polyol.

13. The foam of claim 8 which also comprises up to about 0.25% by weight of a destabilizing silicone ingredient.

* * * * *

UNITED STATES PATENT AND TRADEMARK OFFICE
CERTIFICATE OF CORRECTION

PATENT NO. : 4,826,882
DATED : May 2, 1989
INVENTOR(S) : Charles W. Bredbenner et al.

It is certified that error appears in the above-identified patent and that said Letters Patent is hereby corrected as shown below:

Col. 1, line 36, change "$(RCOO)_nR$" to -- $(RCOO)_nR'$ --.

Col. 2, line 31, change "abovedescribed" to -- above-described --.

Col. 9, line 12, change "polylester" to -- polyester --.

Signed and Sealed this

Fifth Day of December, 1989

*Attest:*

JEFFREY M. SAMUELS

*Attesting Officer*   *Acting Commissioner of Patents and Trademarks*